United States Patent [19]

Kunz et al.

[11] Patent Number: 4,814,090

[45] Date of Patent: Mar. 21, 1989

[54] SYSTEM FOR MEASURING THE LOADING OF AN ION EXCHANGE FILTER

[76] Inventors: Gerhard Kunz, Ruhrstrasse 111, 5628 Heiligenhaus; Johannes Goebel, Rupt-sur-Moselle-Str. 32, 6501 Stadecker-Elsheiml, both of Fed. Rep. of Germany

[21] Appl. No.: 91,221

[22] Filed: Aug. 31, 1987

[51] Int. Cl.$^4$ .............................................. B01J 49/00
[52] U.S. Cl. .................................. 210/662; 210/96.1; 210/143
[58] Field of Search ...................... 210/662, 96.1, 143, 210/670

[56] References Cited

U.S. PATENT DOCUMENTS 2,938,868  5/1960  Carlson et al. ...................... 210/662
4,257,887  3/1981  Rak et al. ........................... 210/96.1
4,299,698  11/1981 Rak et al. ........................... 210/96.1

Primary Examiner—Ivars Cintins
Attorney, Agent, or Firm—Fleit, Jacobson, Cohn & Price

[57] ABSTRACT

A temperature compensated differential between electrical conductivity measurements of a filter medium during passage therethrough of liquid being treated and measurement of the liquid alone after treatment, is utilized to calculate a conductivity ratio based on a reference value reflecting a minimum electrical conductivity measurement under ion saturation conditions in an ion-exchange filter. The filter is switched from an operational mode to a regenerating mode in response to detection of a predetermined conductivity ratio corresponding to approach of the filter to a clogged condition.

10 Claims, 3 Drawing Sheets

SYSTEM FOR MEASURING THE LOADING OF AN ION EXCHANGE FILTER

BACKGROUND OF THE INVENTION

This invention relates in general to monitoring the loading of an ion-exchange filter by measurement of electrical conductivity.

An ion-exchange filter used for example in a water softener apparatus, is exposed to raw water after regeneration so that the ions stored in a sodium phase, are exchanged for calcium ions in the raw water. The ion concentrations of the sodium and the calcium undergo change until system equilibrium of the ion concentration is established between the exchange phase and the liquid phase. Thus, an ion concentration profile of the calcium is developed in the exchanger which migrates in the flow direction through the exchanger to leave a calcium concentration in the exchange phase which is at equilibrium with the concentration in the aqueous solution being treated, such as raw water. In the aqueous solution, a concentration profile of the calcium is also established, determined by the concentration profile of the exchanger phase.

It is already known in the prior art that the termination of end point loading in an ion-exchange filter may be achieved by measuring in two or more phases perpendicular to the flow direction, the electrical resistances of the filter contents, consisting of the aqueous solution and the exchange phase such as a resin filter medium. From such measurements, the differences in resistance is determined to locate the loading front. Such determined resistance differentials for the filter contents, are utilized to generate a signal for optical and/or acoustic readout and/or to initiate regeneration of the filter medium. According to one prior art proposal, a reference resistance is measured by a pair of reference electrodes and the resistance being monitored is measured by a pair of measuring electrodes. The two pairs of electrodes are interconnected with two additional resistances to form a bridge circuit. After regeneration is completed, the reference resistances and the measurement resistances are the same, so that the bridge circuit is balanced. If the concentration profile of the calcium migrates in the flow direction through the ion-exchanger and reaches the measuring electrode pair, the measurement resistance increases and the bridge circuit is unbalanced. Connected to the output of the bridge circuit is a comparator having one input to which an AC voltage reduced by the measurement resistance is applied and a second input to which an adjusted reference voltage reduced by the reference resistance is applied. If the voltage difference between the measurement voltage and the reference voltage exceeds a preset value, a relay is switched on and a timing motor started. The difference in resistance is used to directly or indirectly generate a signal for optical and/or acoustic indications and/or trigger a regeneration process.

The actual application of the foregoing method was found to have serious drawbacks. In a series of tests, it was found that the resistances in the filter medium, for example, determined in two planes and used for subtraction, may differ greatly even after it has undergone uniform chemical treatment in those planes by uniform regeneration. Such deviations in the resistance behavior are serious because they can affect the subtraction process to such an extent that a definite detection of the load condition is no longer possible and/or faulty initiation of regeneration results.

A particular source of uncertainty in the foregoing method is that the resistances in the planes of measurement may be random or may deviate in the same or opposite directions, and the resulting errors in the subtraction process are further increased.

In the event relatively little regenerant is used during regeneration, as is presently called for in view of environmental pollution from widespread use of water softeners, the resistance difference needed for reliable signal generation is no longer available or else is within the error range of resistance deviations.

Another major drawback to the aforementioned known measuring process is that no distinction can be made between the regenerated and the loaded state of the exchanger filter layer. Partial loading states also cannot be distinguished when the filter layer has been blended so that concentration gradients no longer exist in the flow direction. This happens for example, after regeneration is performed and the regenerant feed has failed. A filter controlled by the aforementioned prior art system would start operation again after faulty regeneration.

After prolonged operation of ordinary filter systems, the capacity of the ion-exchanger can be reduced for example by irreversible absorption of iron and/or manganese. A specific drawback of the known process is that unless a certain capacity of the ion-exchanger has been reached, regeneration is no longer initiated and the filter controlling process does not deliver softened water as a product. Soft water consumer systems connected to the outputs of such filter systems risk being destroyed as a result of such behavior of heretofore known measuring processes.

It is therefore an objective of the present invention to cope with the problems of determining the degree of loading of ion-exchangers and to perform such determination with respect to both layered and unlayered exchangers as well as to determine the efficiency of regeneration and perform a measurement operation that requires apparatus that is simple to manufacture, easy to install in filter systems, largely trouble-free, capable of reliably controlling a filter system and preventing the discharge of untreated raw water.

Further objects of the invention include relativized measurement of the ion mobility with respect to a saturation concentration, preferably in the loaded ion-exchanger state and use of signals developed therefrom for controlling the filter systems, particularly water softener filters.

Still further objects of the invention include higher reliability of operation and reduced regenerant consumption for less environmental pollution.

SUMMARY OF THE INVENTION

In accordance with the present invention, electrical conductivity or resistance is measured in only one plane perpendicular to the flow direction and the degree of loading therefrom by a comparison technique to substantially reduce the error arising from different layering of the filter content during the recurrent load cycles. In particular, error aggravated by different layer behaviors is precluded. As a result, a substantially prominent signal is available for controlling the filters in a trouble-free manner.

Because of the more prominent signal developed, the use of small amounts of regenerant is possible. Thus, the salt output in waste water produced during each regeneration process and the resulting environmental pollution, is substantially reduced especially with respect to the drainage of chlorides from the regenerant.

By means of the measuring process of the present invention, the degree of regeneration of the exchanger phase in relation to the loaded exchanger phase is determined from which one may also determine whether regeneration is satisfactory, incomplete or has had no effect. The signal is thus made available after none or incomplete regeneration to initiate another regeneration process or switching off the filter operation. As a result, a high degree of safety against "overrunning" the filters is achieved as well as reliable protection of other systems connected to the outputs of the filter.

If the capacity of the ion-exchanger is impaired after prolonged operation, as detected from measurements made in accordance with the invention, because the exchanger has for example irreversibly absorbed iron and/or manganese, such condition can also be detected by the process of the present invention. If, at an unforeseeable point in time, regeneration is no longer sufficient because of the loading condition detected, the available signal is then also capable of switching off the ion-exchange filter operation, thereby preventing the entry of hard water into soft water consumer systems connected to the outlet of the ion-exchange filter. The control configuration for conducting the process of the invention is relatively simple, easy to produce with commercial components, suitable for conversion of existing filter systems and largely trouble-free.

The process of the invention will be described in detail hereinafter and illustrated on the basis of an embodiment shown in the drawing.

BRIEF DESCRIPTION OF DRAWING FIGURES

DETAILED DESCRIPTION OF PREFERRED EMBODIMENTS

Figure 1:
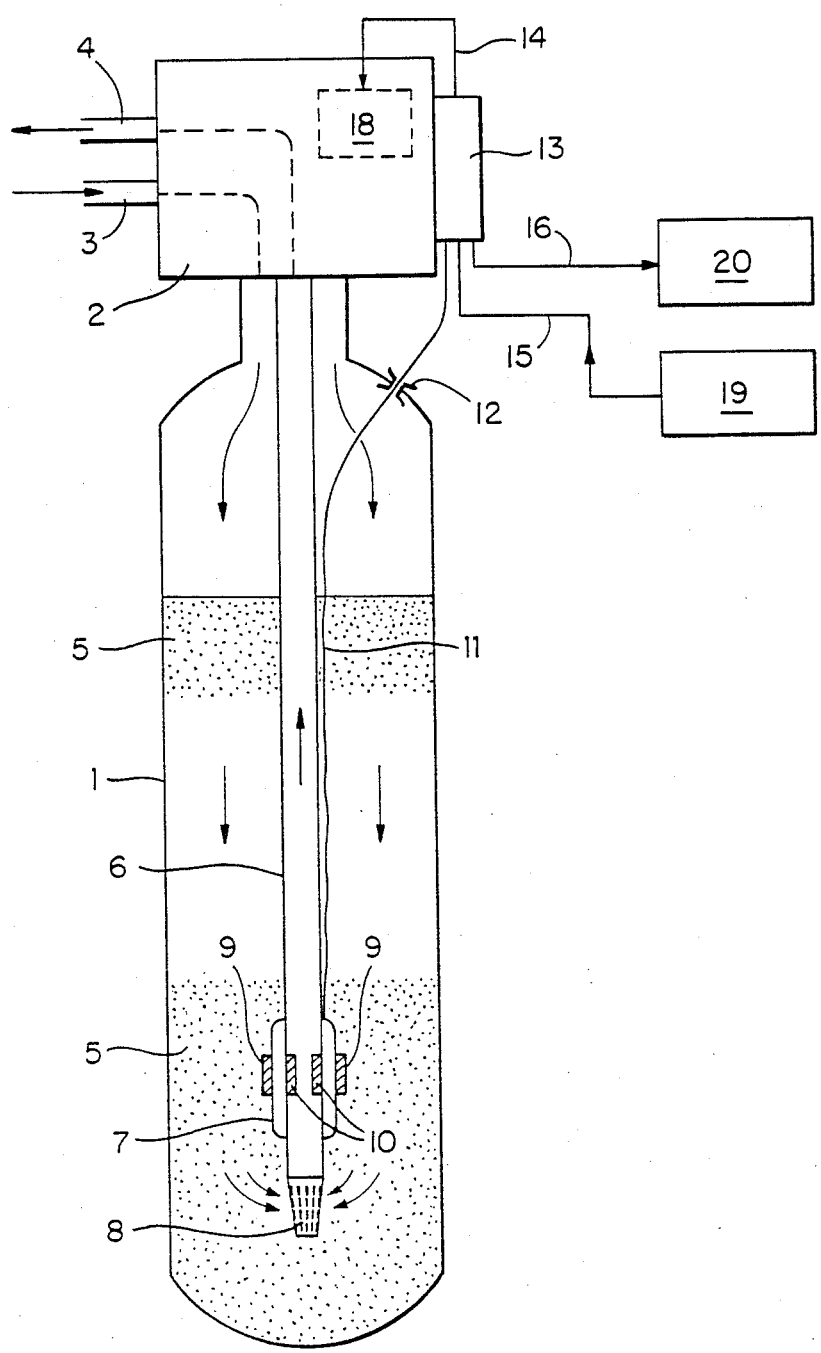
FIG. 1 is a schematic sectional view of a filter system in accordance with the invention with associated transducer and measuring and control electronics diagramatically shown.

FIG. 1 shows a filter system utilized by way of example for softening raw water such as surface water or ground water. It consists essentially of a cylindrical filter container 1, a flow control valve assembly 2 with infeed and discharge lines 3 and 4, a body of particulate ion-exchange medium 5 and a central upflow tube 6. The central upflow tube 6 at its upper end exhausts into the flow control valve assembly 2 and is received at its lower end within an outer tubular socket of a transducer 7. The transducer is designed with a double tubular arrangement having a filter nozzle 8 fitted in the inner-tubular portion at its lower end. The transducer has at its outer periphery, a first electrode pair 9 and at its inner periphery a second electrode pair 10.

Figure 2:
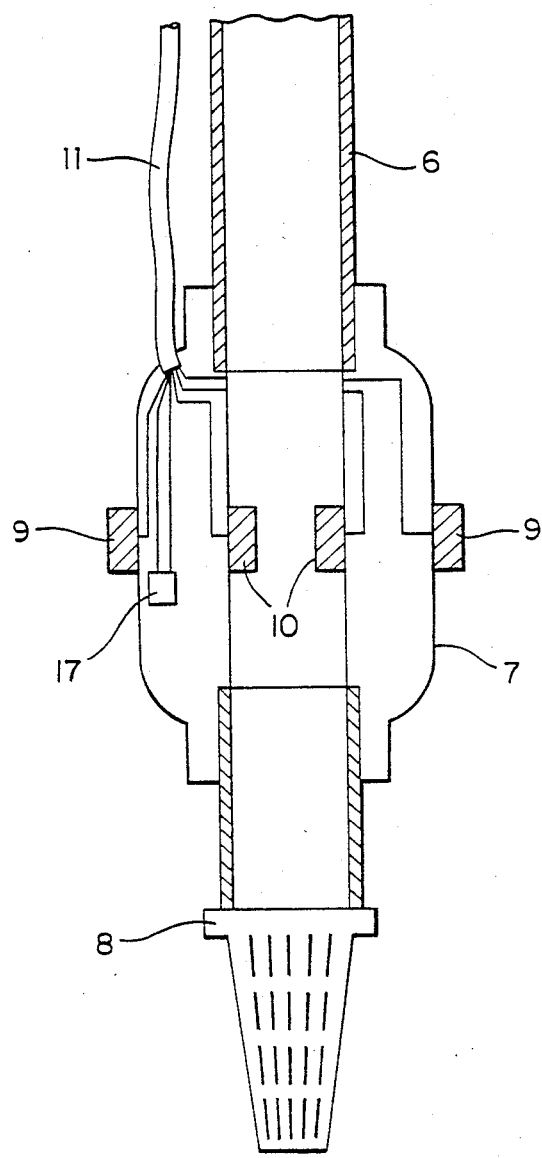
FIG. 2 is a schematic illustration of a transducer in an enlarged view.

The transducer 7 is connected to measuring and control electronics 13 through a cable 11 which is routed through a fitting 12 on the filter container 1. The measuring and control electronics 13 is connected by electrical lines 14 with a actuator drive system 18 of the flow control valve assembly 2 and also has a line 15 from a power supply 19. A line 16 also extends from the electronic control for remote transmission of control signals. In the embodiment shown in greater detail in FIG. 2, the transducer 7 includes a temperature sensor 17 located in the region between the first electrode pair 9 and the second electrode pair 10. The electrode pairs and the sensor 17 are connected to the measuring and control electronics 13 through cable 11. At the lower end of transducer 7, filter nozzle 8 is installed while the upper end of the transducer is connected to the central upflow tube 6.

In the embodiment illustrated in FIG. 1, the filter system receives raw water, which is fed into the ion-exchange medium 5 in the filter container 1 via line 3 of flow control valve assembly 2. The ion-exchange medium 5 together with the water in the interstices between its particles in the regenerated state, surround the first electrode pair 9. The raw water introduced into the ion-exchange medium 5 is softened at the uppermost filter layer thereof by absorption of the calcium ions (and also the magnesium ions), in exchange for sodium ions added to the water. Through the particle interstices in the body of ion-exchange medium 5, the softened water flows past the first electrode pair 9 and leaves the ion-exchange medium 5 through filter nozzle 8. Softened utility water then flows past the second electrode pair 10 within the transducer 7 and exits the filter container 1 through tube 6, passing through flow control valve 2 assembly into the discharge line 4 of the filter system. The measuring and control electronics 13, in response to continuous, instantaneous measurement inputs received from the electrode pairs 9 and 10 and temperature sensor 17, records the temperature-compensated degree of loading of the ion-exchange medium in the region of transducer 7.

As the ion-exchange medium 5 continues to be loaded, the concentration profile of the calcium therein migrates downwardly toward transducer 7. When the calcium concentration reaches the region of the first electrode pair 9, the measuring and control electronics 13 records more-or-less rapid loading in such region.

If a preset threshold corresponding to filter clogging is exceeded, the actuator drive system 18 of the flow control valve assembly 2 is actuated by signal transmission through cable connection 14 and the regeneration mode, ordinarily programmed in the control valve assembly, is started. At the same time, a signal travels through cable line 16 and shuts off or switches soft water consumer systems 20 connected to the outlet of the filter system while it is being regenerated.

It is apparent that if two filters are suitably circuited, an alternating operation can be controlled, in which one filter system takes over the production of soft water while the other is in a regeneration mode and vice-versa. The moment the aforementioned threshold is exceeded and the regeneration mode occurs, the exchange medium 5 is not yet loaded with calcium ions in the region below the first electrode pair up to the filter nozzle 8 and is thus in the regenerated state. The water flowing out of the lower filter layers of the exchange medium 5 through filter nozzle 8, tube 6 and discharge line 4 just before the switching operation occurs, will still be soft water with desired product quality.

Once regeneration is initiated, the regenerating mode of operation proceeds as is shown, in accordance with the programming of the flow control valve 2. During such regeneration mode, the transmission of control pulses from the measuring and control electronics to the actuator drive system of the flow control valve assembly 2 is cut-off. After regeneration is completed, cut-off is removed. Once regeneration is sufficient, the measuring and control electronics 13 in response to outputs of transducer 7, records the regenerated state of the exchange medium 5 and the filter system is ready for its water softening operation. In the event regeneration is insufficient, the actuator drive system of flow control valve system 2 is re-activated and regeneration initiated again.

Figure 3:
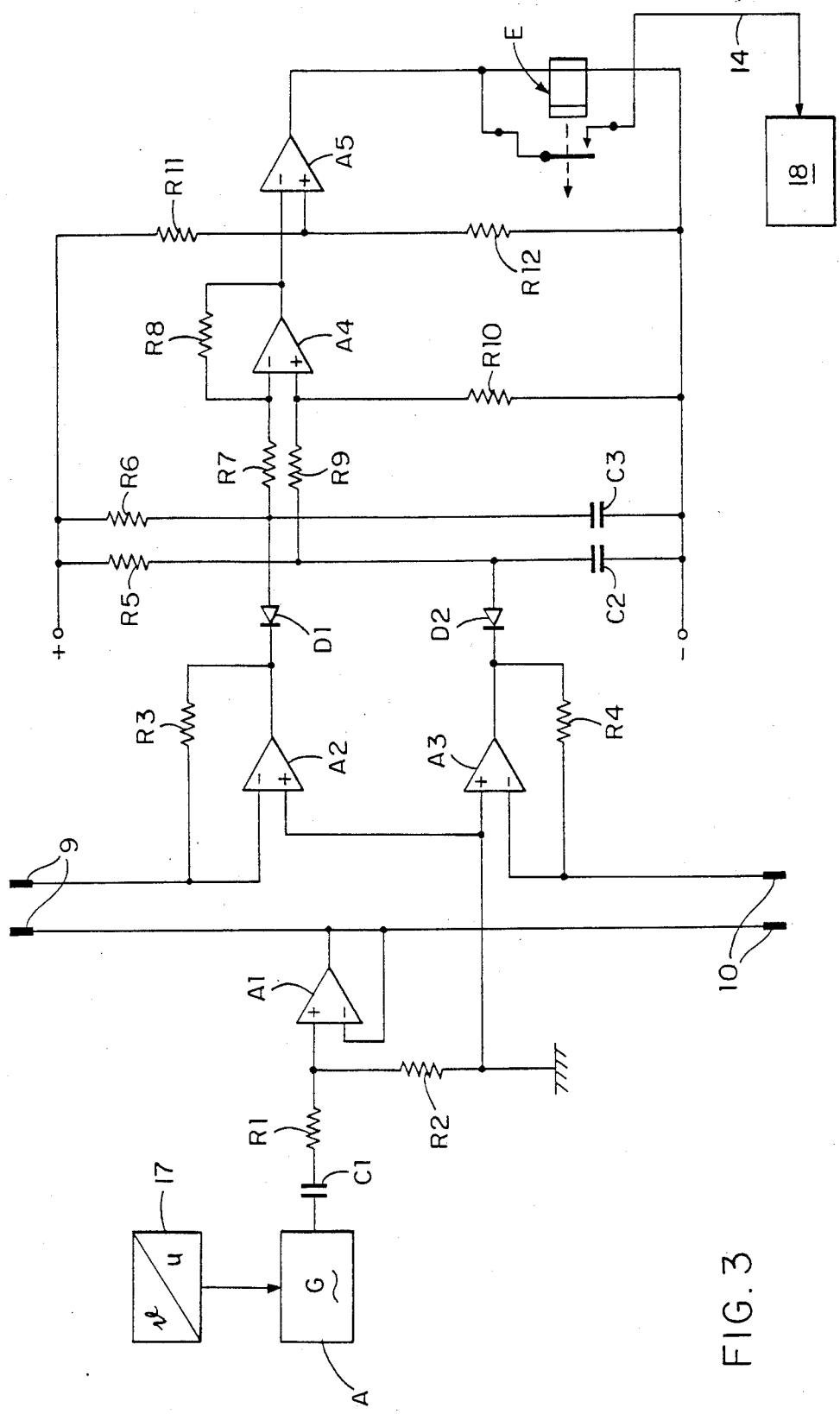
FIG. 3 is an electrical circuit diagram illustrating a specific embodiment for performing the process of the invention.

FIG. 3 is a circuit diagram illistrating one specific embodiment of the electronics 13 for practicing the process of the invention. A sine wave current generator A generates an AC voltage, and by means of temperature sensor 17 aforementioned, operatively connected thereto, the AC voltage is reduced with inreasing temperature. The characteristic curve of the temperature sensor 17 is chosen so that the output of generator is an inverse function of the temperature being sensed and corresponds to the temperature-conductivity characteristic of the material being measured in the ion-exchange filter, for example ordinary raw water.

By means of a capacitor C1 connected to the output of the sine wave current generator A, the AC voltage is decoupled and symmetry with respect to ground potential is achieved by means of resistors R1 and R2. The resistor R1 is connected to one side of capacitor C1 and to the non-inverting input of an impedance converter A1, while resistor R2 is arranged between such non-inverting input and ground. The output of the impedance converter A1 is connected to its inverting input and to the electrodes of the electrode pairs 9 and 10 aforementioned, to feed thereto a low-resistance measuring voltage. The other electrodes of the electrode pairs 9 and 10 are respectively connected to the inverting inputs of the operational amplifiers A2 and A3 while the non-inverting inputs of such amplifiers are grounded. The operational amplifiers A2 and A3 together with feedback resistors R3 and R4 form measuring amplifier circuits, each delivering an AC voltage rectified by diodes D1 and D2 and smoothed by filters R5, C2 and R6, C3. Resistors R3 and R4 are selected such that the amplitude ratio of the outputs of amplifiers A3 and A2 is about 2:3.

The cathodes of diodes D1 and D2 are connected to the outputs of amplifiers A2 and A3, respectively, while the anodes of diodes D1 and D2 are connected to the capacitors C3 and C2, respectively. The two capacitors C2 and C3 are connected in parallel to the diodes D1 and D2 and the two resistors R5 and R6, while the sides of the two capacitors C2 and C3 opposite the resistors R5 and R6 are connected to a negative terminal of an operational voltage source in the power supply supply 19 aforementioned. A differential amplifier A4 is connected to the outputs of amplifiers of A2 and A3 through the diodes D1 and D2 and signal coupling resistors R7 and R9. The inverting input of the amplifer A4 is connected through the resistor R7 to diode D1 while the non-inverting input is connected through resistor R9 to the cathode of diode D2. A resistor R10 is interconnected between the non-inverting input of differential amplifier A4 and the negative terminal of the operational voltage source while a resistor R8 is interconnected between the output of differential amplifier A4 and the inverting input thereof. By means of the foregoing circuit arrangement, the signal gains of amplifiers A2 and A3 are so regulated that the outputs thereof rectified by diodes D1 and D2 produces an output from differential amplifier A4 not affected by the conductivity of the liquid phase being measured by the electrode pairs 9 and 10.

The inverting input of a comparator A5 is connected to the output of the differential amplifier A4. A reference voltage for comparator A5 is set by a voltage divider including resistors R11 and R12 connected at their juncture to the non-inverting input of the comparator and arranged between the terminals of the operational voltage source. The reference voltage in the loaded state of the ion-exchange filter is set by the voltage divider to a value slightly higher than the output voltage of the differential amplifier A4, whereby a relay E installed between the negative terminal of the operational voltage source and the output of the comparator A5, responds. The reference voltage so set corresponds to the storing of data on a conductivity measurement made with respect to a filter medium of minimum conductivity under ion saturated conditions.

In the regenerated state of the ion-exchange filter, the output voltage of the differential amplifier A4 is higher than the reference voltage of comparator A5 so that the relay E is not energized and its contacts are open. After a preset loading condition is detected, such as clogging energization of relay E occurs to close its contacts and the process is recycled.

A display 22 is connected to the comparator A5 for readout of the degree of loading and the operational state of the ion-exchange filter. To prevent brief disturbances from initiating regeneration, the regeneration mode does not start until a certain delay time has elapsed.

According to other embodiments of the measuring and control electronics 13, the electrical conductivity measurements obtained through the two electrode pairs 9 and 10 may be digitally evaluated.

It would be appreciated by persons skilled in the art that various deviations from the described embodiments of the invention are possible and that many modifications and improvements may be made within the scope and spirit of the invention. Thus, it will be understood that the invention is not limited by the specific embodiments described, but only by the scope and spirit of the appended claims.

What is claimed is:

1. A method for monitoring an ion-exchange filter to determine clogging thereof, wherein liquid to be treated is passed through a filter medium, including the steps of: continuously measuring instantaneous electrical conductivity of the filter medium in only one plane with the liquid passing therethrough in a direction of flow perpendicular to said one plane during operation of the filter; continuously measuring the electrical conductivity of the liquid alone after passing through the filter medium; compensating said continuous conductivity measurements for variations in temperature; determining a differential between said continuous conductivity measurements compensated for variations in temperature; continuously calculating the ratio of said differential to conductivity reference data; and transforming said calculated conductivity ratio into a signal reflecting the loading condition of the filter.

2. The method of claim 1 including the step of: initiating regeneration of the filter when said signal reaches a preset limit.

3. The method of claim 2 including the step of: measuring a selected filter medium of minimum electrical conductivity under ion saturation conditions within the filter; and storing said ion saturation measurement of minimum electrical conductivity as the reference conductivity data.

4. In a system for monitoring an ion-exchange filter apparatus having a resin filter medium therein through which a liquid to be treated is passed during an operational mode and flow control means for switching the filter apparatus between said operational mode and a regenerating mode, comprising first electrode means in the filter medium for measuring electrical conductivity through the filter medium only in one plane perpendicular to a direction of flow of the liquid through the filter medium during said operational mode, second electrode means for measuring electrical conductivity of the treated liquid after passing through the filter medium, temperature compensating means for sensing variations of temperature in the filter apparatus and electronic means operatively connecting the electrode means and the temperature compensating means to the flow control means for determining a differential between the measured conductivities and switching the filter apparatus to the regenerating mode in response to a predetermined ratio of said differential to a conductivity reference value.

5. The system of claim 4 wherein said electronic means includes a pair of measuring amplifiers respectively connected to the first and second electrode means, differential amplifier means connected to said measuring amplifiers for producing an output corresponding to the conductivity measurement differential, a comparator having a first input receiving said output of the differential amplifier means and a second input to which a reference voltage is applied reflecting said conductivity reference value and relay means connecting the comparator to the flow control means for effecting said switching to the regenerating mode.

6. The system of claim 5 wherein the electronic means further includes means for rectifying and smoothing output signals of the measuring amplifiers fed to the differential amplifier means.

7. The system of claim 6 including gain control means connected to the measuring amplifiers for adjusting the rectified output signals thereof to render the output of the differential amplifier means unaffected by the conductivity of the liquid being treated.

8. The system of claim 5 further including voltage divider means connected in shunt relation to the second input of the comparator for establishing said conductivity reference value.

9. The system of claim 5 wherein the electronic means further includes a sine wave current generator, said temperature compensating means comprising a transducer connected to the generator and an impedance converter connecting the current generator to the electrode means.

10. The system of claim 9 wherein the transducer varies the output of the current generator as an inverse function of the temperature of the filter medium.

* * * * *